May 2, 1950 — N. B. CLEVELAND — 2,505,753
ADJUSTABLE ROTARY VIBRATOR
Filed Oct. 15, 1946

*INVENTOR.*
NORMAN B. CLEVELAND
BY

Patented May 2, 1950

2,505,753

UNITED STATES PATENT OFFICE 2,505,753

ADJUSTABLE ROTARY VIBRATOR

Norman B. Cleveland, Beverly, Mass.

Application October 15, 1946, Serial No. 703,271

4 Claims. (Cl. 74—87)

(Granted under the act of March 3, 1883, as amended April 30, 1928; 370 O. G. 757)

This invention relates to new and useful improvements in a mechanical vibrator device which when mounted upon and supported by another object a measured vibration can be induced in said object, and by selected adjustments in the said device, the frequency and amplitude of the induced vibration may be varied to suit requirements.

In many instances, as for example, when instruments are mounted on an instrument panel of an airplane it is desirable to set up vibrations of a given range so as to observe the effects thereof on the accuracy of said instruments or the point at which the accuracy is detrimentally affected. It is also often desirable to subject various instruments, spark plugs, and other devices to vibrations of a given magnitude for extended periods of time so that their "life" under such conditions of vibration may be determined.

Sometimes it is necessary to calibrate instruments and devices for service under varying conditions of vibration.

A device which subjects another object to high frequency vibrations of various amplitudes must be of rugged construction and capable of withstanding relatively high rotational speeds, without overheating or breaking down, because said device is subjected to the same vibrations and loads as are being applied to the object under test. The bearings for the high speed rotating, unbalanced weight are of the ball type in this device and must be well supported in a substantial housing and provided with sealed in lubrication so as to protect them from external dirt and dust. However, other high speed bearings such as needle or roller types may be used.

The unbalanced rotating mass in this device is mounted on amply strong heat-treated steel adjusting screws for moving said rotating mass toward or away from its center of rotation so as to decrease or increase the amplitude of the induced vibrations. In this device the bearings are securely locked in place by U-shaped spring washers and the whole device is securely built to withstand the severe shaking within its operating range and safety factors.

Various weights, for the rotating mass, are selected for various amounts of unbalanced force desired in addition to the adjusting of each weight toward or away from its center of rotation. The screw adjustment of each weight causes a variation of the unbalanced force and a resulting variation in the amplitude of vibration produced.

The principal object of this invention is to provide a vibrator as a means for producing vibrations, of varying amplitudes and frequencies, in an object to which the device is attached.

Another object of this invention is to provide a vibrator which has a quick and easily operated adjustable means for eccentricity of the rotating mass or weight that controls the amplitude of vibration induced by said vibrator.

Still another object of this invention is to produce a vibrator that is rugged, compact, simple to build, and with a calibrated scale to indicate increments of static unbalance suitable for the locating of said weight so as to obtain any given condition of the unbalanced force, and the resulting vibration, within the range of the weights and speeds of said device.

Still a further object of this invention is that of a vibrator which has built-in, sealed ball or other type anti-friction sealed bearings which retain their lubricant and stay free of dust and dirt so as to operate for long periods of time without attention and without overheating.

These and other objects of the invention, and the various features and details of the construction, operation and use thereof, are hereinafter more fully set forth and described with reference to the accompanying drawing in which like numbers refer to like parts and in which.

Figure 1:
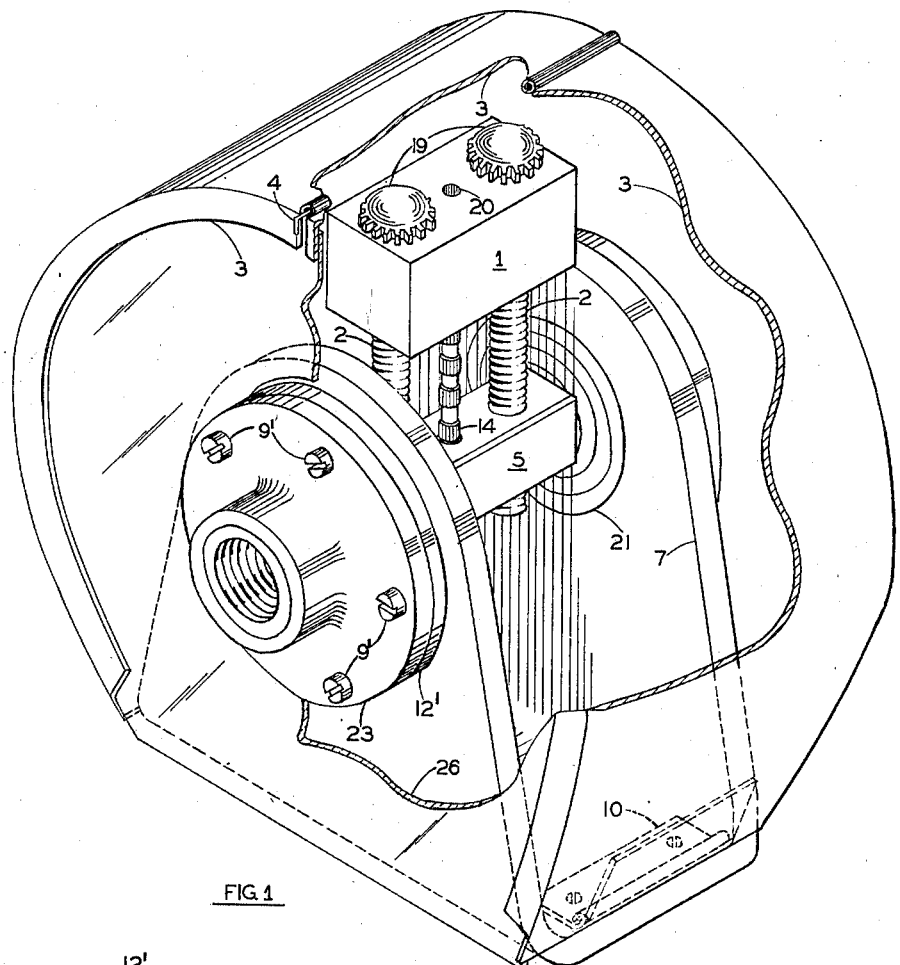
Fig. 1 is an isometric view of the device with a portion of the housing cut away.
Figures 2, 3:
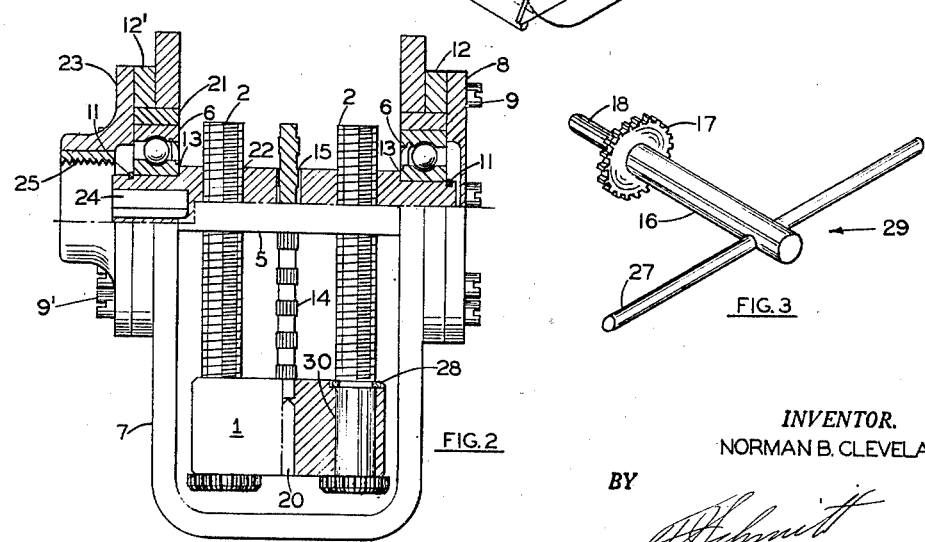
Fig. 2 is an elevational view in section showing the rotating shaft and the two screws for the adjustment of the rotating weight and also the measuring pin, the weight being displaced 180° from its position in Fig. 1.
Fig. 3 is an isometric drawing of the key used to turn the adjusting screws to obtain the desired location of the unbalancing rotating weight.

In the drawings, wherein for the purpose of illustration is shown a preferred embodiment of my invention, the reference numeral 7 designates a yoke-like frame supporting a rotatable shaft 5 journalled therein thru means of sealed ball bearings 6 and sleeves 21. One side of said journalled shaft arrangement is provided against lateral displacement by means of annular spacer 12 and cover plate 8 secured to said frame by means of screws 9, and the other side by means of annular spacer 12' and hub 23 secured to said frame by means of screws 9'. Keyhole 24 in shaft 5 is provided for engagement with a flexible shaft drive, and threads 25 are provided in hub 23 for engagement with the flexible shaft casing not shown.

Shaft 5 is provided with a parallel pair of threaded diametral holes 22 therethrough to receive screws 2 in threaded engagement therewith. The heads of said screws are provided with gear teeth 19 adapted to be simultaneously actuated by a gear wrench to be described hereinafter. Weight 1 having a pair of parallel holes 30 therethrough is adapted to be slidingly received by screws 2, and is secured in juxtaposition to the screw heads by locking means such as lock rings 28.

Additional bores 20 and 15 are provided thru weight 1 and shaft 5, respectively. Graduated rod 14 is secured in bore 20 as by a press fit, and is extended to be received by bore 15 in shaft 5. Rod 14 is calibrated to indicate increments of its displacement relative to the axis of shaft 5.

A wrench 29 is provided comprising a shaft 16, a gear fixed intermediate the ends of said shaft being adapted to engage with gears 19. One end 18 of said shaft is adapted to be received by hole 20, and the other end is provided with a transverse handle 27 for the manual application of the torque thereto.

In operation, one of a preselected group of weights 1 is assembled to the instrument in the manner hereinbefore described and the shaft 5 rotated by any driving means thru keyway 24. Due to the rotation of the unbalanced mass system consisting of shaft 5 and weight 1, a vibration is induced in frame 7. This vibration can be transmitted to any object such as an instrument panel on "life" test by mounting the invention thereon. The amplitude of the vibration may be varied by turning the screws 19 thru means of wrench 29 thereby moving the mass toward or away from its center of revolution thus increasing or decreasing the balance of the system. Recordings can be taken directly from rod 15 which can be calibrated into amplitudes, or calibrated into increments of weight 1 displacement which can be converted into amplitudes. The frequency of vibration may be varied by increasing or decreasing the R. P. M. of the driving means. Different weights may be used to expand the range of utility.

A two-part casing hinged to the base of the frame 7 as at 10, and retained in a closed position by pin connection 4, encloses my invention against foreign matter, a safety guard against the revolving mass.

While a particular embodiment of this invention has been illustrated and described herein, it is not intended that this invention be limited to such disclosure, and changes and modifications may be made and incorporated within the scope of the claims.

The invention described herein may be manufactured and used by or for the Government of the United States of America for governmental purposes without the payment of any royalties thereon or therefor.

I claim:

1. A mechanical vibrator, comprising: a frame; a rotatable shaft journalled therein adapted to be connected to driving means; screw means connected to rotate with said shaft, a weight carried by said screw means; and indicating means including a rod having indicia thereon fixed at one end to said weight and extending parallel with said screw means through a hole traversing said shaft, said indicating means calibrated to indicate increments of adjustable displacement of said weight relative to the axis of said shaft.

2. A mechanical vibrator, comprising: a frame; a rotatable shaft having a parallel pair of threaded diametral holes therethrough, and adapted to be connected to driving means; sealed anti-friction bearings supporting said shaft in said frame; a pair of screws threadedly engaged with said threaded holes, the heads of said screws being provided with gear teeth and adapted to be simultaneously actuated by a gear wrench; a weight having a pair of holes therethrough to receive said screws; means for releasably locking said weight in juxtaposition to said heads; and indicating means calibrated to indicate increments of displacement of said weight relative to the axis of said shaft.

3. A mechanical vibrator, comprising: a frame; a rotatable shaft journalled therein adapted to be connected to driving means, said shaft having a parallel pair of threaded bores therein transverse to axis of said shaft; screw means threadedly engaged with said threaded bores and projecting from said shaft; and a mass carried by said screw means.

4. A mechanical vibrator, comprising: a frame; a rotatable shaft journalled therein adapted to be connected to driving means, said shaft having a parallel pair of threaded holes therethrough transverse to the axis of said shaft; screws engaged with said threaded holes and projecting from said shaft; a removable mass jointly carried by said screws; and indicating means including an indicia-marked rod positioned centrally between said screws co-planar therewith and secured at one end to said mass, the other end adapted to project through a hole in said shaft to indicate displacements of said mass relative to said shaft.

NORMAN B. CLEVELAND.

REFERENCES CITED

The following references are of record in the file of this patent:

UNITED STATES PATENTS

| Number | Name | Date |
|---|---|---|
| 1,125,500 | Ensminger | Jan. 19, 1915 |
| 1,208,100 | Cornwall | Dec. 12, 1916 |
| 1,288,554 | France | Dec. 24, 1918 |
| 1,789,975 | Heil et al. | Jan. 27, 1931 |
| 1,874,775 | Marsh | Aug. 30, 1932 |
| 2,065,798 | Dempey | Dec. 29, 1936 |
| 2,323,479 | McCullough | July 6, 1943 |

FOREIGN PATENTS

| Number | Country | Date |
|---|---|---|
| 320,836 | Italy | Sept. 10, 1934 |